(12) United States Patent
Schaffer

(10) Patent No.: US 9,477,320 B2
(45) Date of Patent: *Oct. 25, 2016

(54) INPUT DEVICE

(71) Applicant: ARGOtext, Inc., Rockaway, NJ (US)

(72) Inventor: Mark Schaffer, Rockaway, NJ (US)

(73) Assignee: ARGOtext, Inc., Rockaway, NJ (US)

( * ) Notice: Subject to any disclaimer, the term of this patent is extended or adjusted under 35 U.S.C. 154(b) by 359 days.

This patent is subject to a terminal disclaimer.

(21) Appl. No.: 13/790,209

(22) Filed: Mar. 8, 2013

(65) Prior Publication Data

US 2014/0104180 A1    Apr. 17, 2014

Related U.S. Application Data

(63) Continuation-in-part of application No. 13/210,457, filed on Aug. 16, 2011, now Pat. No. 8,641,306.

(60) Provisional application No. 61/713,728, filed on Oct. 15, 2012.

(51) Int. Cl.
*G06F 3/02* (2006.01)
*G06F 1/16* (2006.01)
*G06F 3/023* (2006.01)
(Continued)

(52) U.S. Cl.
CPC ............... *G06F 3/02* (2013.01); *G04G 17/08* (2013.01); *G04G 21/08* (2013.01); *G06F 1/163* (2013.01); *G06F 1/169* (2013.01); *G06F 3/0202* (2013.01); *G06F 3/0236* (2013.01)

(58) Field of Classification Search
None
See application file for complete search history.

(56) References Cited

U.S. PATENT DOCUMENTS 4,043,116 A * 8/1977 Schlappi ............ G04B 19/00
                                              368/223
4,497,982 A * 2/1985 Michalski ............ 200/5 R
(Continued)

FOREIGN PATENT DOCUMENTS

EP    2 267 578      12/2010
JP    2004-288172    10/2004
(Continued)

OTHER PUBLICATIONS

K.Partridge et al., "TiltType: Accelerometer-Supported Text Entry for Very Small Devices". Chi Letters, vol. 4, Issue; 201-204.
(Continued)

*Primary Examiner* — Antonio Xavier
(74) *Attorney, Agent, or Firm* — Stephen J. Lieb; Frommer Lawrence & Haug LLP

(57) ABSTRACT

The present invention is a data entry device featuring a novel way of touch-typing on a small smart-device using two or more opposing touchpad surfaces positioned around a display, said surfaces comprising a housing. Bumps or other touch sensitive features are arrayed around the periphery of a digital display on the device. The bumps or other touch sensitive features provide both a locating means for finger placement and a zone for sensing the shift of a pressure point or sensing motion of the finger along the surface, the shift or motion in a preferred direction indicating a selection from a displayed menu to be made by lifting the finger from contact. A novel way of holding the device by its wrist band or handle or strap while fingering the bumps leads to a fluid method of keying functionalities for use as a phone and as an internet-enabled texting device.

15 Claims, 7 Drawing Sheets

(51) Int. Cl.
   *G04G 17/08*        (2006.01)
   *G04G 21/08*        (2010.01)

(56)              References Cited

U.S. PATENT DOCUMENTS

| | | | |
|---|---|---|---|
| 4,847,818 A | 7/1989 | Olsen | |
| 5,384,756 A * | 1/1995 | Pelosi | A44C 25/00 368/10 |
| 5,416,730 A * | 5/1995 | Lookofsky | G06F 1/163 361/679.02 |
| 6,286,064 B1 * | 9/2001 | King et al. | 710/67 |
| 6,304,459 B1 * | 10/2001 | Toyosato | G06F 1/163 312/208.4 |
| 6,597,345 B2 | 7/2003 | Hirshberg | |
| 6,734,881 B1 * | 5/2004 | Will | G06F 1/1626 715/811 |
| 7,145,554 B2 * | 12/2006 | Bachmann | 345/173 |
| 7,170,496 B2 | 1/2007 | Middleton | |
| 7,209,114 B2 * | 4/2007 | Radley-Smith | 345/156 |
| 7,505,798 B2 * | 3/2009 | Hofer et al. | 455/575.1 |
| 7,828,697 B1 * | 11/2010 | Oberrieder | A63B 24/0062 482/1 |
| 8,552,992 B1 * | 10/2013 | Kim | G06F 3/0234 345/173 |
| 8,641,306 B2 * | 2/2014 | Schaffer | 400/477 |
| 8,830,181 B1 * | 9/2014 | Clark et al. | 345/173 |
| 2002/0027549 A1 * | 3/2002 | Hirshberg | G06F 3/0234 345/168 |
| 2002/0135615 A1 * | 9/2002 | Lang | G04G 21/00 715/764 |
| 2003/0030595 A1 * | 2/2003 | Radley-Smith | 345/1.3 |
| 2003/0099163 A1 * | 5/2003 | Yang | G04B 37/1486 368/281 |
| 2003/0122784 A1 * | 7/2003 | Shkolnikov | G06F 1/1626 345/169 |
| 2003/0151982 A1 * | 8/2003 | Brewer et al. | 368/46 |
| 2004/0183817 A1 * | 9/2004 | Kaasila | 345/660 |
| 2004/0196256 A1 * | 10/2004 | Wobbrock et al. | 345/156 |
| 2005/0030292 A1 * | 2/2005 | Diederiks | 345/173 |
| 2005/0123333 A1 * | 6/2005 | Sugimura | H01H 25/002 400/485 |
| 2005/0249046 A1 * | 11/2005 | Gueissaz | G04G 21/00 368/160 |
| 2006/0077073 A1 | 4/2006 | Chen | |
| 2006/0092177 A1 * | 5/2006 | Blasko | 345/619 |
| 2006/0170649 A1 * | 8/2006 | Kosugi et al. | 345/156 |
| 2006/0227117 A1 * | 10/2006 | Proctor | 345/173 |
| 2006/0274609 A1 * | 12/2006 | Lindsey | G04B 25/04 368/230 |
| 2007/0024595 A1 * | 2/2007 | Baker et al. | 345/173 |
| 2009/0122025 A1 * | 5/2009 | Chu | G06F 3/04886 345/173 |
| 2009/0146848 A1 * | 6/2009 | Ghassabian | G06F 1/1615 341/22 |
| 2009/0315826 A1 * | 12/2009 | Lin et al. | 345/157 |
| 2010/0079395 A1 * | 4/2010 | Kim | G06F 1/1626 345/173 |
| 2010/0135128 A1 * | 6/2010 | Penula | G04B 37/0008 368/281 |
| 2010/0153881 A1 * | 6/2010 | Dinn | G06F 17/30572 715/825 |
| 2010/0238111 A1 * | 9/2010 | Chen et al. | 345/157 |
| 2010/0287470 A1 * | 11/2010 | Homma | G06F 3/03547 715/702 |
| 2010/0331145 A1 | 12/2010 | Lakovic et al. | |
| 2011/0043491 A1 | 2/2011 | Oh | |
| 2011/0063787 A1 * | 3/2011 | Griffin | G06F 1/1626 361/679.08 |
| 2011/0109594 A1 * | 5/2011 | Marcus | G06F 3/04886 345/178 |
| 2011/0134068 A1 * | 6/2011 | Shimoni | G06F 3/04883 345/173 |
| 2011/0157046 A1 | 6/2011 | Lee et al. | |
| 2011/0193787 A1 * | 8/2011 | Morishige | G06F 3/016 345/173 |
| 2012/0120567 A1 * | 5/2012 | Hsieh | G04G 17/00 361/679.01 |
| 2012/0280914 A1 * | 11/2012 | Ladouceur et al. | 345/169 |

FOREIGN PATENT DOCUMENTS

| | | |
|---|---|---|
| JP | 2005161322 A * | 6/2005 |
| JP | 2011-516959 | 5/2011 |
| WO | WO 02/10865 | 2/2002 |
| WO | WO 2009/145464 | 12/2009 |

OTHER PUBLICATIONS

Notification Concerning Transmittal of International Preliminary Report on Patentability (IPRP) dated Apr. 30, 2015 corresponding with PCT/US2013/064502, 8 pages.

Office Action issued in corresponding Japanese Application No. 2014-526147 dated Jun. 14, 2016 and its English Translation.

* cited by examiner

INPUT DEVICE

RELATED APPLICATIONS

The present application claims priority under 35 U.S.C. 119 to U.S. Provisional Application No. 61/713,728, filed on Oct. 15, 2012 and this present application is a Continuation-in-Part from U.S. application Ser. No. 13/210,457, filed Aug. 16, 2011, which issued as U.S. Pat. No. 8,641,306.

FIELD OF THE INVENTION

This invention relates to data input devices, and more particularly to a keyboard device on a handheld object.

BACKGROUND OF THE INVENTION

The miniaturization of electronic devices has increasingly made them more portable and convenient to carry. Wireless devices, such as cell phones, are now carried in pockets and purses, an accessory item as indispensible as wallets and keys. Smartphones, served by portable operating systems and software "Apps", have taken over substantial functionality from laptop computers, which had mobilized desk-bound computers in an earlier generation of technology. The ultimate goal of the miniaturization process is to produce a multi-functional device, capable of both voice and data communication, which is as wearable as a watch and as user-friendly as the input device called a mouse.

While technological advances have greatly reduced the size of electronic displays, manual data entry still carries demands for finger-sized layouts. Phone keypads reduce the number of keys over the standard QWERTY keyboard, but they inconvenience the user by requiring multiple keystrokes to enter text. Touch screen technology has moved the keyboard onto the display itself, but accuracy with finger control still requires a certain amount of territorial separation. The mechanical keys may be eliminated, but the display area, not the size, is the beneficiary of the displaced space. One method of reducing the input area on the display is to use a stylus to pinpoint the touch zone. Unfortunately, small implements tend to get lost and are almost never at hand when needed. Reducing the keyboard to the size of a wristwatch or other device small to the hand, without taxing the user with keystroke repetition or auxiliary equipment, requires an innovative approach.

U.S. Pat. No. 4,847,818 to Olsen teaches placing mechanical keys on the face of a watch. Such positioning, however, leaves little room for displaying information. Chen, in U.S. Patent Application 2006/0077073, places the mechanical keys around the periphery of the watch casing and on shoulders adjacent to the watch face. This arrangement removes the competition for display space. In both instances, however, the minimal separation distance required for accurate finger placement essentially limits the functionality to a phone keypad. Moreover, pushing buttons with one finger is a slow data entry mode, and, with the device bound to one wrist, there is likely to be some awkwardness in the positioning of the hands, not to mention fatigue over an extended session.

Operating a QWERTY keyboard or other data input method on a small scale requires a multi-functional key with selection capability. Such a multi-functional key would eliminate the one-to-one correspondence of keys and functions and result in a reduced keyboard layout. Hirshberg, in U.S. Pat. No. 6,597,345, discloses a solution by making sliding finger contact in one of several detectable directions on a two-dimensional surface. The problem with a two-dimensional surface, however, is accommodating finger-sized touch zones with sufficient boundary space to enable discrimination of events. This space requirement makes it impossible to shrink the layout to a size comparable to that of a watch face.

There is an unfilled need for QWERTY keyboard and other input functionality on the scale of a wristwatch. Such a device could be the next multi-functional, internet-linked, App-enabled, Smartphone. Such functionality might require, for example, a multiplicity of selection options from a relatively few, narrowly-fenced, touch zones around a watch face periphery. It might also require, to match the convenience and speed of legacy keyboards, a fluidity of keystroke entry from hand positions comfortably arranged for long-term tasking. The instant invention provides novel solutions in both apparatus and method to meet this need.

SUMMARY OF THE INVENTION

It is accordingly an object of the present invention to provide a data entry device for portable devices suitable for wrist deployment or that can be worn or carried or handheld, for example, devices such as smart devices built into belt buckles, pocket watches, hair berets, sneakers, TV remote controls, handheld game controllers, water bottle caps, table coasters and the like. It is a further object to enter data on said device by means of touch interaction with one or more fingers. It is a further object to locate controls on the side surfaces of the device in order to optimize the display of information on the facing surface of the device. It is a further object to provide a means for sufficiently precisely locating the focal point or sensitive area for detecting input on a surface of the device, such as a touch zone. It is a further object to provide multiple selections for functionality at each touch control. It is a further object to provide said multiple selections by sensing the movement of a pressure point or finger movement in a preferred direction within the zone. It is a further object to facilitate bounding where necessary for the pressure point or finger movements on or across a touch zone. It is a further object to provide multiple touch surfaces on an object housing in a plurality of three-dimensional orientations to facilitate manipulation by opposing fingers and thumbs. It is a further object to facilitate both one-handed and two-handed operation. It is a further object to provide means and method for comfortably holding and manipulating the device. It is a further object to utilize multiple fingers, in a simultaneous or sequential touch mode, to make the data entry a more fluid process. It is a further object to expand the library of functionalities by sequencing touches.

These objects, and others to become hereinafter apparent, are embodied in a data entry device for wrist deployment or deployments previously described, comprising, in a first part, a housing having a top surface and four side surfaces forming a periphery there around; in a second part, a digital display on the top surface; in a third part, a wrist-band, holding straps, or handles connected to two opposing side surfaces, the wrist band, holding straps, or handles functioning to removably attach the housing to a person's wrist; in a fourth part, at least one panel on each of the two remaining, unbanded, side surfaces; in a fifth part, at least two bumps, or one or more ridges, indentations, or angles to the touch surfaces, or perceivable distance separations or other divisions (hereafter referred to as bumps) on each of at least one panel on each side, each bump configured to receive the touch of a finger-tip or to provide a tactile cue to direct a fingertip to a sensor, each bump enabled or each bump and surrounding panel or each small panel with sensor technology at least in a zone surrounding or adjacent to said bump enabled to respond to finger-tip pressure toward one of at least two preferred directions in the plane of the panel; and, in a sixth part, a programmable processor coupled with memory resident in the housing, the processor in signal communication with the sensor technology and the digital display and programmed to associate each bump with a stored menu and each preferred direction with a functionality. With the data entry device configured with these parts, and with the thumb and index fingers of each hand hovering over the unbanded side surfaces, a functionality can be selected by touching at least one of the bumps with one of the hovering fingers or in the alternative the finger guided to the exact or approximate appropriate area of the touch surface by the above methods (for example, ridges etc. listed above) to cause a menu to be displayed by the integrated processor on the digital display and thereafter urging the touching finger toward one of the preferred directions as indicated by the menu.

In a preferred embodiment, the data entry device comprises two panels stacked upper and lower on each of the two unbanded side surfaces, the upper and lower panels inclined to each other and to the display, each upper panel and one of the lower panels each having three zones defined by bumps thereon enabled with sensor technology. The nine bump locations are mimicked in a grid area of the digital display, wherein each cell of the grid would display alphabet characters corresponding to available selections from the corresponding bump. The alphabet characters are distributed among the cells in rough correspondence to a QWERTY keyboard layout. Another area of the display shows the entries made by the selections of individual characters resulting from directional pressure manipulation at an active bump before touch is released there from.

In an alternate embodiment, a method of entering data comprises, in a first step, providing the data entry device as described above to the wrist of a person to be omnipresent; in a second step, removing the data entry device from the wrist; in a third step, holding the data entry device in a reading position with at least one of the middle, ring or little fingers of each hand gripping the wrist-band from both sides, whereby the index fingers and thumbs can be deployed to hover over the at least one panel; in a fourth step, touching at least one bump with a thumb or index finger to cause a menu of functionality choices to appear on the display; in a fifth step, selecting one of the choices by urging the touching finger or thumb in one of the preferred directions indicated by the menu; and, in a last step, entering the selection by releasing the touch.

In a particular alternate embodiment, the providing step is enhanced with a timer to discriminate simultaneity with respect to two-finger touches. With the index finger and thumb deployed in a clamp-like manner for closing upon two bumps on opposite sides of the device, the range of key-able functionality can be greatly expanded by simultaneous or sequential dual touches. The expansion would enable use of the device for sophisticated applications, such as for Apps, added texting symbols and functions, internet browsing, or picture-taking.

Screens can be nested so that sequential screens shown using the two-finger input or any other input can provide further screens with related choices that cannot be found on the limited surface available on one screen: For example, a second screen accessible from the typing keyboard screen with all numbers, followed by a third screen accessible from the second with common mathematical symbols, followed by a fourth screen accessible from the third with uncommon mathematical symbols, etc.

Other exemplary schemes involved using any other sensor system that can approximate a fingers presence and direction of motion without touch, such as laser, radar, light or other proximity sensors can be used. This applies to both one-finger and two-finger touch input motions.

According to a further embodiment of the invention there is provided a data entry device comprised of any smart device that is small to the hand, worn on the body, held, carried, or of necessity small such as smart devices built into belt buckles, pocket watches, hair berets, sneakers, TV remote controls, handheld game controllers, water bottle caps, table coasters, etc., etc.) Such device having a strap, handle, shape or mounting such that it can be fixed in place or can be gripped using any of the lower three fingers of the hand, thereby freeing the index fingers and thumbs of one or each hand. And each touch surface being divided or separated or in construction or to the sense of touch by or one or more ridges, indentations, protrusions, chamfers, angles to the touch surfaces, perceivable distance separations, or other divisions. Imprecise starting points within a sensor area (a portion of the touch plane) may be interpreted by intelligent software using direction of movement. The user can view a grouping of letters on the view screen and touch the adjacent or appropriate sensored plane in the approximate area of that letter grouping, and the software will determine which letter grouping is appropriate because it is nearest to the finger, and then software can determine which particular letter in the grouping is the chosen letter from the direction that the finger is removed. An accomplished user can approximate the distances that fingers reach along all touch surfaces, and not need the keyboard screen or a physical marker on the touch surface because he is habituated to the distances and may prefer using the entire touch screen for typing results and no keyboard. This device can provide a tactile queue to allow the user to position fingers on each of the chamfered and horizontal touch surfaces without providing a dimple or bump. The edges of the chamfered and horizontal touch surfaces provide this queue.

As this is not intended to be an exhaustive recitation, other embodiments may be learned from practicing the invention or may otherwise become apparent to those skilled in the art.

According to a further embodiment, the chamfered, sensored touch surfaces can be textured to provide tactile queues as to where to begin a finger movement within a touch surface. Also within each touch surface, a very small ridge (comfortable to the finger) can provide tactile queues as to where to begin a finger movement on a touch surface. Also within each touch surface, a very small depression (comfortable to the finger) can provide tactile queues as to where to begin a finger movement on a touch surface. Also the touch surface can be divided by any physical marker so fingers can feel and the user be made aware of the proper area to start a finger motion such as a small raised ridge or a small trough that divides the touch surface and the finger can feel where each division of the touch sensored surface is bounded. Also each touch surface can be perfectly flat and the user can view the keyboard on the screen, and by observing the groupings of the letters the user can determine where to begin each touching and sliding motion to type each result. An accomplished user may learn the distances to extend each finger and may not need the cues from visual screen to approximate the distances, and thereby free the screen from the keyboard because the arrangement of the letters is memorized, and thereby enabling the accomplished user to use the full screen for the resulting text.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

For the purposes of definition, the term "functionality", as used herein, may be taken to mean either an item chosen for data entry or a scripted action programmed to be performed by the system. The term "selection", as used herein, will be taken to mean the indication of a menu choice through the manipulation of contact in a zone of touch sensitivity. The term "enter", as used herein, will be taken to mean an order to execute the selection, either by entry into a data field or by initiating an action, through the withdrawal of intimate contact from the zone.

Figure 1:
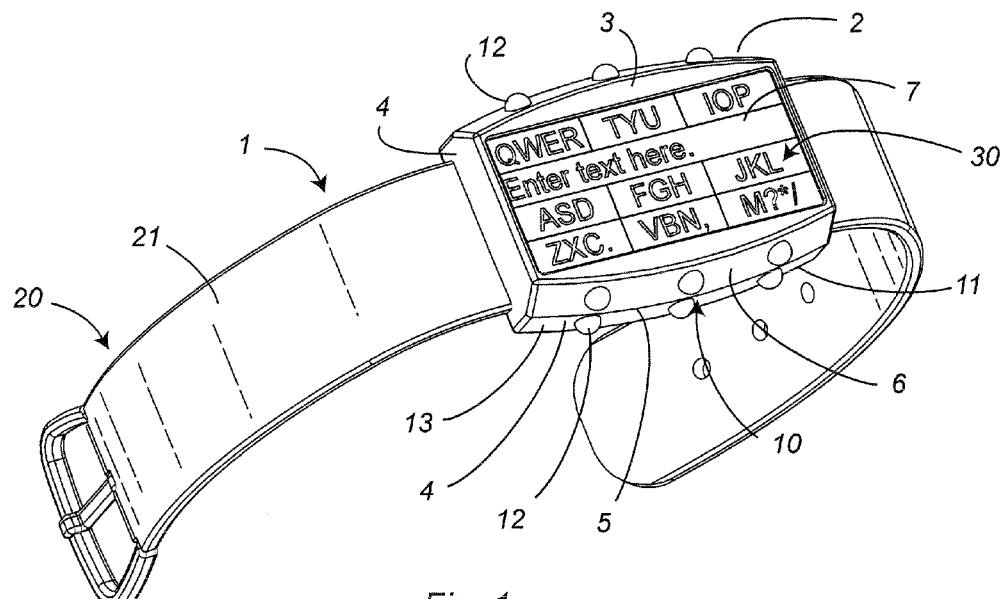
FIG. 1 is a perspective view of the data entry device of the present invention.

Referring to FIG. 1, a data entry device 1 for wrist deployment comprises a housing 2. The housing 2 has a top surface 3 and four side surfaces 4 forming a periphery around the top surface 3. A wrist band 21 is connected to housing 2 at two opposite side surfaces 4. The wrist band 21 provides a means to removably carry the data entry device 1 on a persons' wrist, and thus makes the device omnipresent in much the same manner as a wrist watch. The remaining two side surfaces 4 are unbanded side surfaces which flank the top surface 3. A digital display 7 occupies the top surface 3. The wrist band 21 is an integral part of a means for holding the data entry device 1. The unbanded side surfaces are an integral part of a means for entering data 10 into the data entry device 1. The digital display 7 is an integral part of a means for handling information 30 in the data 1 entry device 1.

In the preferred embodiment, the means for entering data 10 comprises at least one panel 11 on at least one of the side surfaces. In an alternate embodiment, the at least one panel 11 may be deployed on any three-dimensional object having side surfaces, such as a TV remote control 103 (FIG. 7), for example. Each panel 11 comprises at least two bumps 12. The at least two bumps 12 reflect an operational symmetry of two hands, as will be discussed hereinafter. The panel 11 may be a flat surface, but preferably is a curvilinear surface. Such a surface provides additional spacing for the bumps 12. The bumps 12 are embossments, as opposed to debossments, in the surface of the panel 11. Each bump 12 is raised above the panel surface enough to provide tactile registration thereto, but not enough to prevent a touching finger from making contact with the surface, the bump essentially engulfed by the finger similar to a Braille feature. The bump 12 may have any geometrical form, but in a preferred embodiment, the bump is circular with a diameter of approximately 0.200 of an inch.

Additional panels 11 can be added to the side surfaces 5. In order to differentiate the panels on any one side surface 5, and any touch sensitivity zones assigned thereto, added panels 11 should be obtusely inclined away from each other. One way to do this is to chamfer the edge between the side surfaces and the top surface to create chamfer surfaces flanking the top surface. In a preferred embodiment, the panels 11 comprise two upper panels 6 positioned on the chamfer surfaces and one lower panel 13 on one of the sides 5. Each of the three panels 11 so defined are provided with three bumps 12 each, bringing the total to nine bumps. The configuration of nine bumps 12 reflects correspondence with a QWERTY keyboard, as will be discussed hereinafter.

Figure 8:
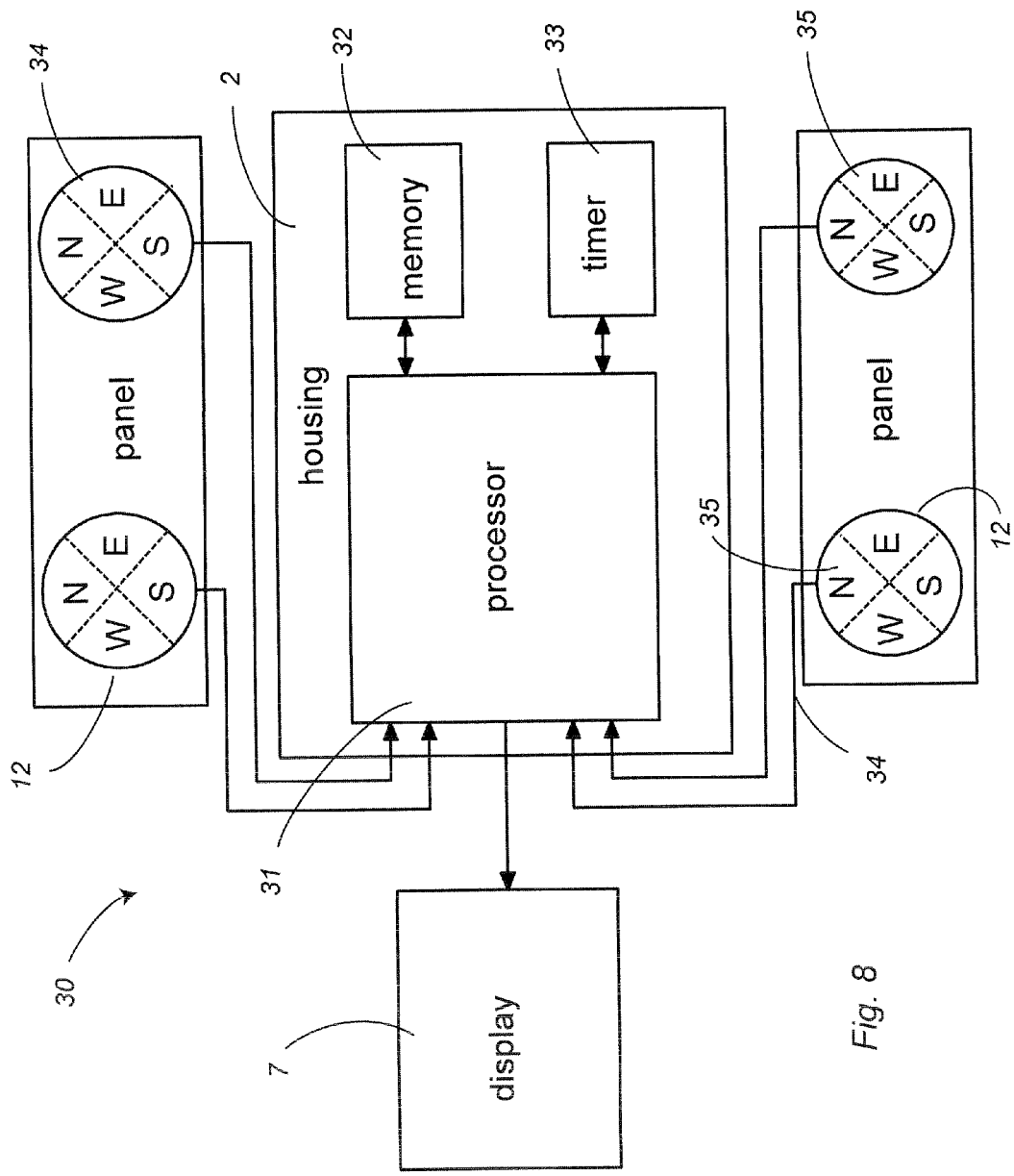
FIG. 8 is a system diagram of the data entry device.

In the preferred embodiment, the means for entering data 10 cooperates with the digital display 7 and the means for handing information 30. In an alternate embodiment, the means for entering data 10 may be linked to a remote display through wireless technology, such as Bluetooth®, for example. Referring to FIG. 8, the means for handling information 30 is comprised of a programmable processor 31 located in the housing 2. The programmable processor 31 is coupled with memory 32. The programmable processor 31 is in signal communication with the digital display 7. The processor is also in signal communication with sensor technology 34 located at the site of each bump 12. In the preferred embodiment, a timer 33, in signal communication with the processor 31, is included in the housing configuration. The sensor technology 34 is sensitive to the application of finger pressure in and around the bump site. The zone of sensitivity can be divided into sectors 35 which define preferred directions 14 and the boundaries thereof. In the preferred embodiment, there are four sectors 35 arrayed orthogonally. The four sectors 35 are arbitrarily named, for purposes of discussion herein, North, South, East and West. When the bump 12 is initially touched, a locus point is registered by the sensor technology 34. When the finger is urged in a North, South, East or West direction, the sensor technology 34 detects a directional path leading from the locus toward one or another of the "compass" directions. Each bump 12, because of its raised configuration, provides tactile feedback for sliding the finger in any direction. With awareness provided by the tactile feedback, the sliding movements in the preferred directions 14 are deliberate and measured in a way to limit slippage into a neighboring sector 35. The planes of adjacent panels 11, intersecting at the chamfer angle, also prevent inadvertent sector contact. Thus, the novel configuration of the bump 12, not to mention the angular separation of the panels, improves upon prior art touch zones which are deficient the means to fence-in directional movements.

Figure 3:
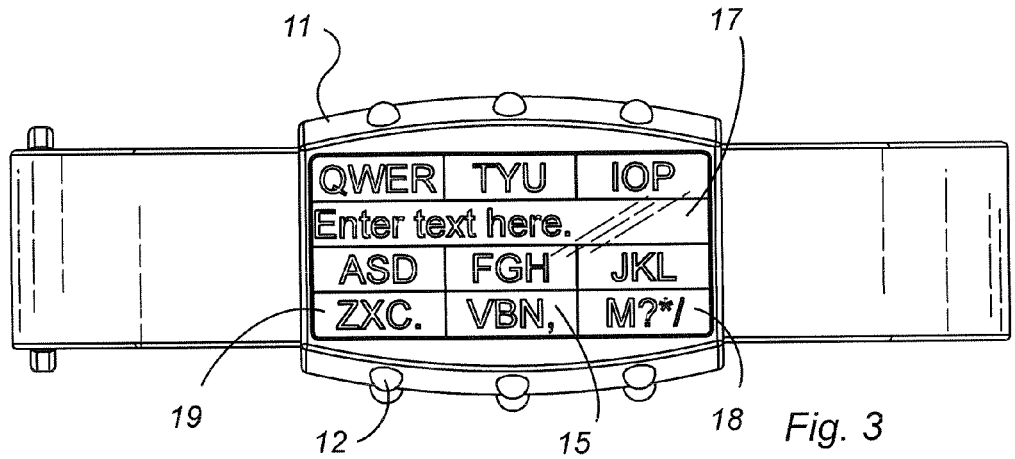
FIG. 3 is a plan view of the data entry device showing a data entry screen.
Figure 4:
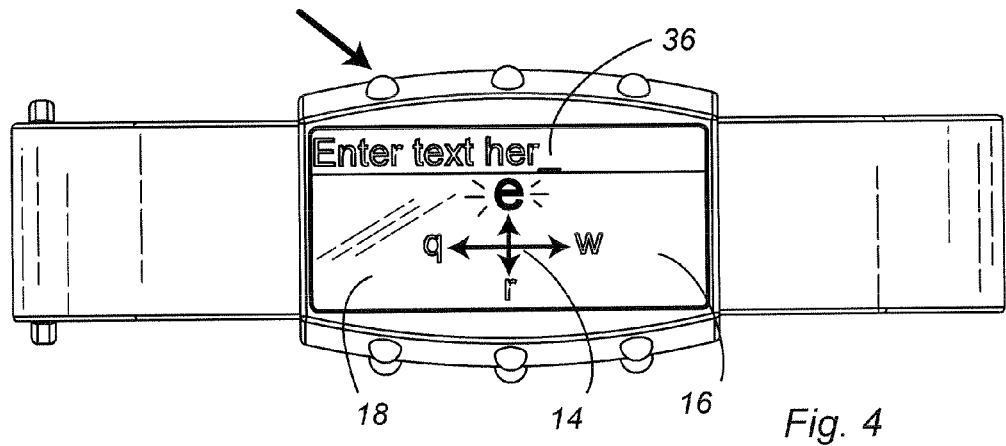
FIG. 4 is a plan view of the data entry device showing a sub-menu for the selection "qwer"
Figure 6:
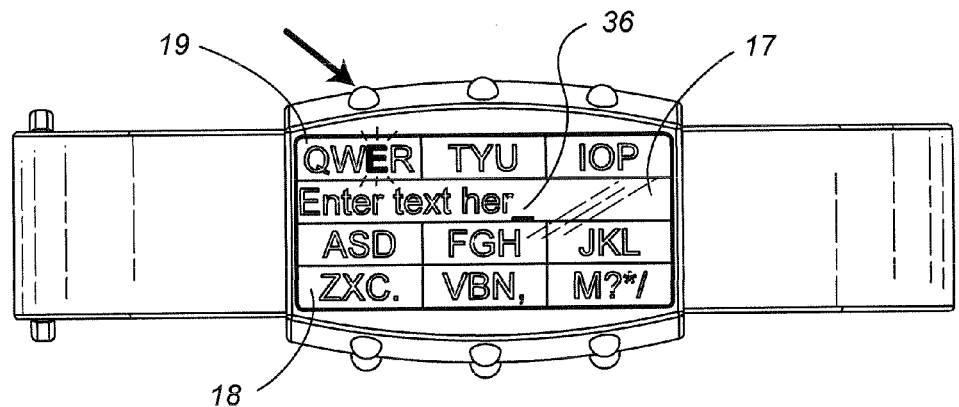
FIG. 6 is a plan view of the data entry device showing an alternate response.

Referring to FIGS. 3 and 4, the digital display 7, in a home state prior to a touch event, displays an entry part 17 and a grid part 18. The grid part 18 displays a menu 15 of choices arranged in cells 19. The cells 19 are positioned to correspond with the positions of the bumps 12. For example, the top left cell 19 corresponds to the bump 12 located on the top panel 11 in the left position. In the preferred embodiment, there are 9 cells 19 in three rows corresponding to the three panels 11. The 26 letters of the alphabet can be distributed among the cells and rows to roughly correspond to the standard QWERTY keyboard. Since most keyboard users are familiar with this layout, locating a particular alpha character of interest is facilitated in this way. For the purpose of discussion herein, the top left bump will be referred to as number 1, and the set of bumps will correspond by number labels 1-9 with the grid positions in left to right and top to bottom order. When the number 1 bump 12, for example, is touched, a sub-menu 16 will appear in the grid 10 part 18, as shown in FIG. 4. The sub-menu 16 will show the characters in the corresponding cell in a spatial relationship indicating the preferred directions 14. The preferred directions 14 may also be indicated by arrows pointing outward from a center corresponding to the locus of the touch event. In the preferred embodiment, there are up to four preferred directions 14 corresponding to North, South, East and West. When the number 1 bump is touched, for example, the letter characters "q", "w", "e" and "r" are displayed in the West, East, North and South directions, respectively. When the touch is urged toward the North direction, the letter "e" is changed in response to confirm its selection. The response can be a change in color, a bolding, or simply an enlargement of the character, as shown in FIG. 4. Alternatively, the letter "e" in the original screen will indicate by bolding, flashing, enlarging, changing color, or other indicating means without the sub-menu 16 appearing, as shown in FIG. 6. When the touch is withdrawn from the number 1 dimple, the selected character is entered in the entry part 17 of the display. A cursor 36 indicates the position for entry of the selected character.

Figure 2:
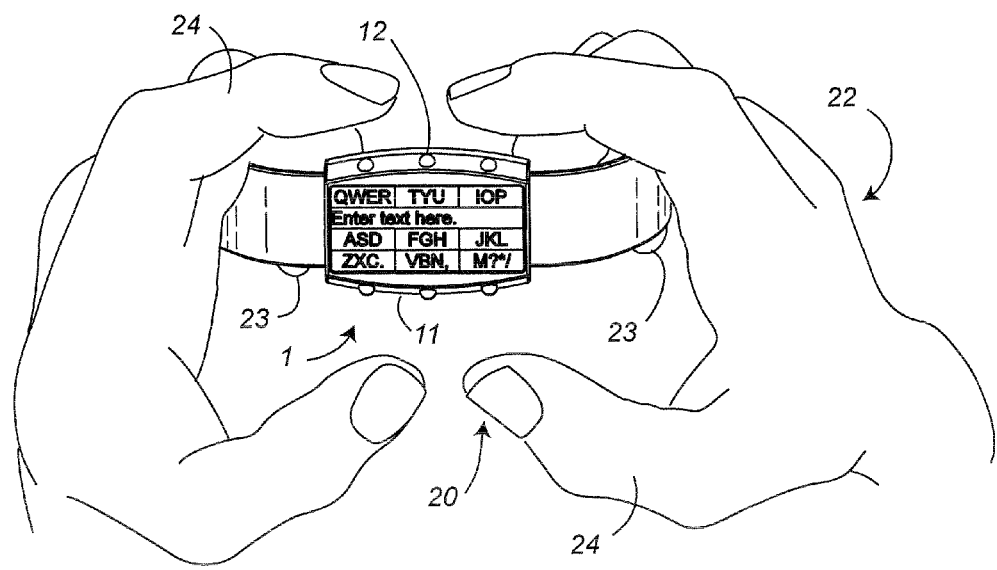
FIG. 2 is a perspective view of the hand and finger positions for holding the data entry device.

Referring to FIG. 2, the means for holding involves both hands of the user. The data entry device 1 is removed from the wrist and oriented for viewing the digital display 7, typically with the wrist band 21 extending left and right. The wrist band 21 is held in both hands by holding fingers 23. By definition, the holding fingers 23 are the middle, ring and little fingers of the hand. The wrist band 21 may be of a clasp type wherein the band separates into two parts, or may be of a bracelet type. Either type configures a closed or open loop into which the holding fingers, in opposite postures, can be curled to support the data entry device 1 in a readable position. A hand hold 22 configured in this manner leaves working fingers 24 available to initiate touches on the bumps 12. By definition, the working fingers 24 are the thumb and index finger of each hand. The working fingers 24 are placed by the grip of the holding fingers 23 in a position to hover over the panels 11. The bi-lateral pairs of working fingers 24 can also operate in cooperative gestures, like a clamp or "pincher", to touch two, or even more, bumps in an event. The hand hold 22 is a natural position for the hands, with the wrists relaxed, and the working fingers 24 suspended for easy articulation. This novel posture for the hands not only makes up to four fingers available for the efficient and dexterous manipulation of the data entry device 1, the posture can be maintained without fatigue or discomfort for long periods during extended data entry sessions.

The working fingers 24 preferably operate either singly or doubly. While other operational modes are possible, with up to four fingers at a time in a single event, the one or two touch mode offers an ample multiplicity of functionality with a minimum of operational complexity. Two touches at a time can be either simultaneous or sequential, as determinable by the timer 33 and a programmed preferred delay 37 (not shown). In the preferred embodiment, the preferred delay 37 is 1-2 seconds, and this can be adjustable for speed and sensitivity purposes. In the preferred embodiment, the two adjacent panels 11 are oriented to the thumb side where joint articulation is superior. Users accustomed to texting will find thumb entry to be more natural, so the preponderance of bumps is allocated to thumb entry. A typical two-touch maneuver might be with the index finger of one hand touching bump numbers 1-3 and the corresponding thumb, in a pincher action, ranging over numbers 4-9: The number of pincher touches is 18 for nine bumps. The number of permutations of two-finger touches taken in sequence is 72. The number of both simultaneous and sequential touches possible is 108. When combined with the 9 single touches offering up to 36 selections, a large library of functionalities can be accessed with either one or two touches.

Figure 11:
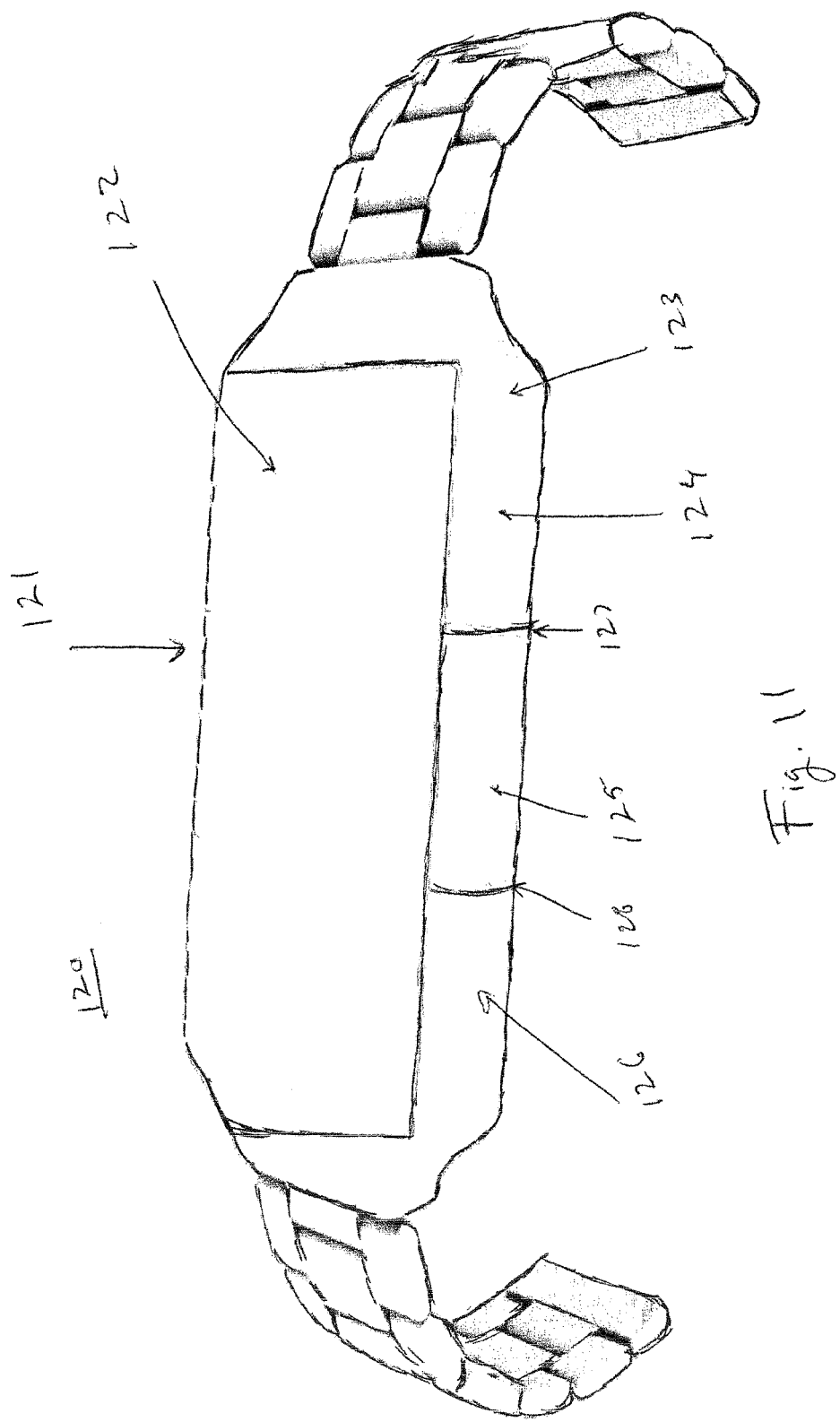
FIG. 11 is a perspective view of a data entry device according to a further aspect of the present invention.

FIG. 11 shows another embodiment according to the invention. Device 121 includes a housing 120. The housing 120 has top surface 122 and a side surface 123. The side surface 123 is divided into three regions 124, 125, and 126. These regions are each equipped with a pressure and motion sensor for detecting a finger pressure and a direction of sliding motion, as discussed with respect to the embodiments above. This embodiment differs from the embodiments described above because the regions equipped with sensors do not include a bump or dimple to provide as tactile queue for the user. Instead, the regions are delineated from one another by grooves 127 and 128. Not shown in FIG. 11, regions separated by grooves and equipped with touch and motion sensors can also be provided on the side of the device opposite to side 123.

As an alternative to the embodiment shown in FIG. 11, the grooves 127 and 128 delineating surfaces 124, 125, and 126 are replaced by raised ridges. These ridges provide the user with a tactile queue to locate the proper locations for contacting the device. According to other aspect of the invention the surfaces 124, 125, 126 could be delineated by one another by being set at an angle with respect to one another such that the user's finger can sense the angled orientation between adjacent surfaces. Any sensor or sensors that can determine contact and the direction of sliding contact can be used. Any strap, handle, affixing device, housing shape, or other means that provides stability to the device and enables free movement of the thumbs and index fingers can be used. Likewise any shape of the device sized to provide touching surfaces for the thumb and index finger of each hand can be used.

Figure 5:
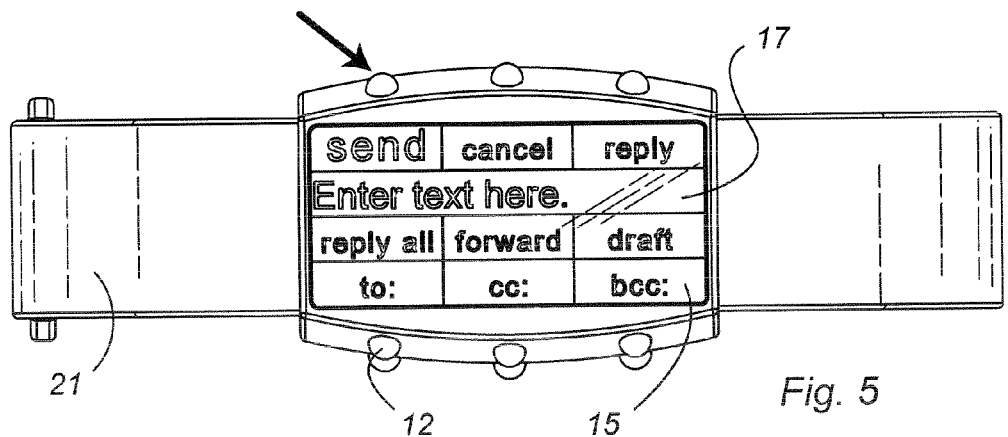
FIG. 5 is a plan view of the data entry device showing a function menu.
Figure 10:
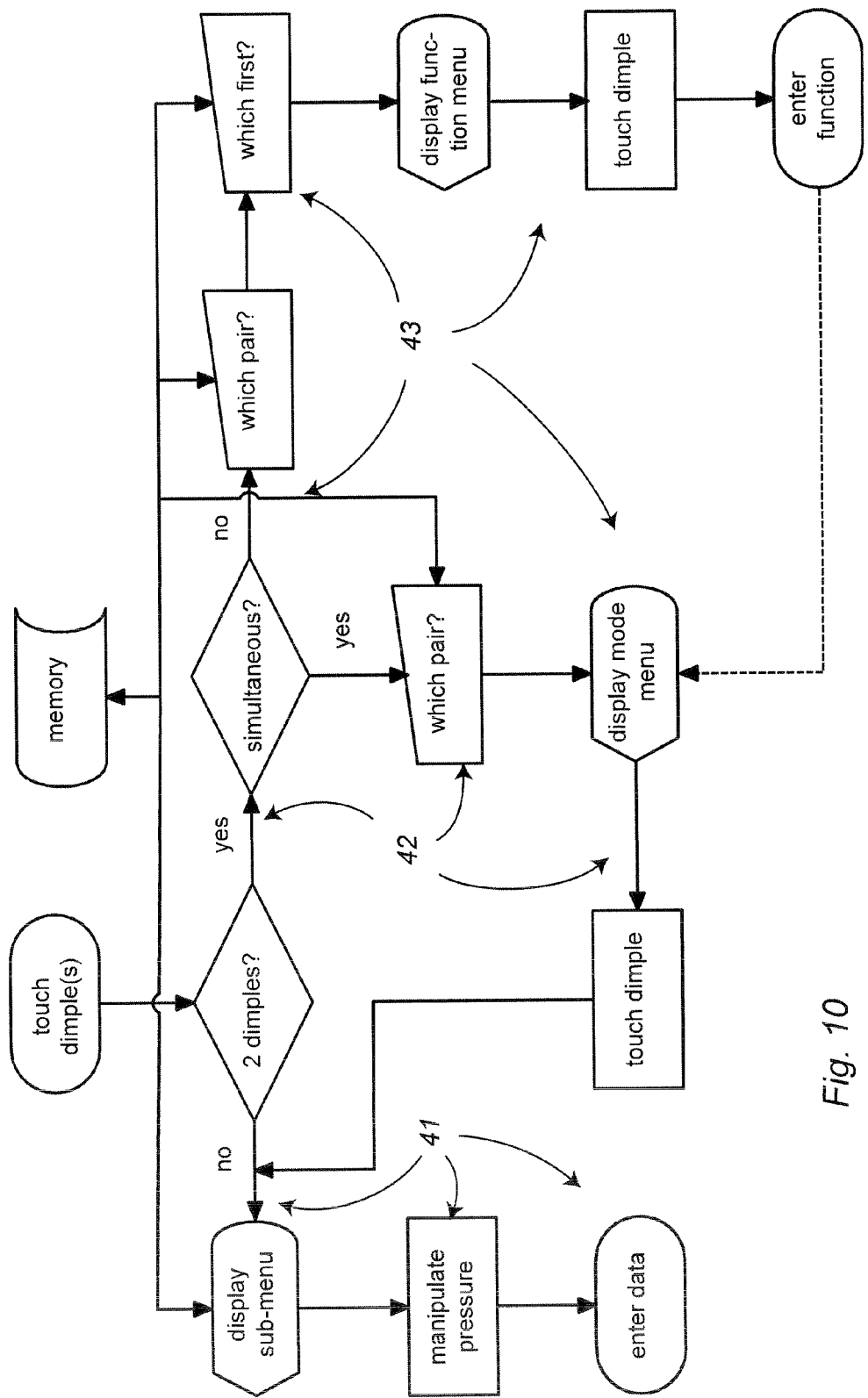
FIG. 10 is a flow diagram showing logic sequences in selecting functions and data.

While many schemes for assigning functionalities to touch events are possible, one exemplary scheme 40 will be discussed here below, referring to FIG. 10. Exemplary scheme 40 is comprised of decision points and paths leading from decision resolution by the processor 31, enabled by sensory input from sensor technology 34 and stored data in memory 32. Each path begins with a touch event and ends with an entry event. Exemplary scheme 40 is comprised of a data entry path 41, a mode entry path 42 and a function entry path 43. Data entry path 41 begins with a single bump touch and leads to the data entry scenario described above, through the display of the sub-menu 16, a pressure manipulation in a preferred direction 14, and a command to enter with the release of the touch. For data entry path 41, the release must occur from a shifted pressure point. If pressure is returned to the locus, the selection is thereby nullified. Mode path 42 begins with a two-bump touch and leads to the decision that the touch is simultaneous. Typically, this type of touch will be with a pincher manipulation, and the path thereafter proceeds to an analysis of which of 18 pairs is indicated. A data entry mode is assigned to each pair, each mode exhibiting a different menu 15 in the grid part 18 of the digital display 7. Data entry modes may be, but are not necessarily limited to upper case alpha, lower case alpha, numerals, and one or more symbol or character sets. After display of the particular menu 1, mode path 42 proceeds along data entry path 41 by returning to a single touch entry. Function path 43 begins with a two-bump touch and leads to the decision that the touch is sequential. Function path 43 then proceeds to an analysis of which of 36 pairs is indicated and which of the indicated pair is first in sequence, the field involving 72 permutations in all. A different menu 15 is assigned to each pair of the function path 43. A typical function menu is shown in FIG. 5, which illustrates, by example, functions related to email processing. In cells 1-6, the functionalities are actions which are triggered by touching and releasing the corresponding bump. The contact will cause recognition of the selection by some visual means, as discussed above, and as shown in cell 1. In cells 7-9, however, additional data entry is indicated. Touching one of those cells will loop into the data entry path 41, as indicated by the dotted-line arrow in FIG. 10.

With function entry path 43, a single touch to a bump 12 is more efficient than manipulating directionally though a sub-menu 16. In the case of data entry, however, because of the multiplicity of selections, it is more efficient to operate through the sub-menus 16 of the data entry path 41 rather than toggling through an extended library of menus 15 in the mode entry path 42. In like manner, simultaneous touching is quicker than sequential touching and, therefore, data entry is facilitated by implementing the simultaneous protocol for the mode entry path 42. Each of the beneficial features mentioned herein, including the bumps 12, the particular configuration of the panels 11, the hand hold 22, the organization of the cells 19 into a QWERTY layout, the working fingers 24 and the configuration of the different paths of the exemplary scheme 40, add to a fluidity of data entry processing unknown and as yet under-achieved in the art of miniature input devices.

Figure 9:
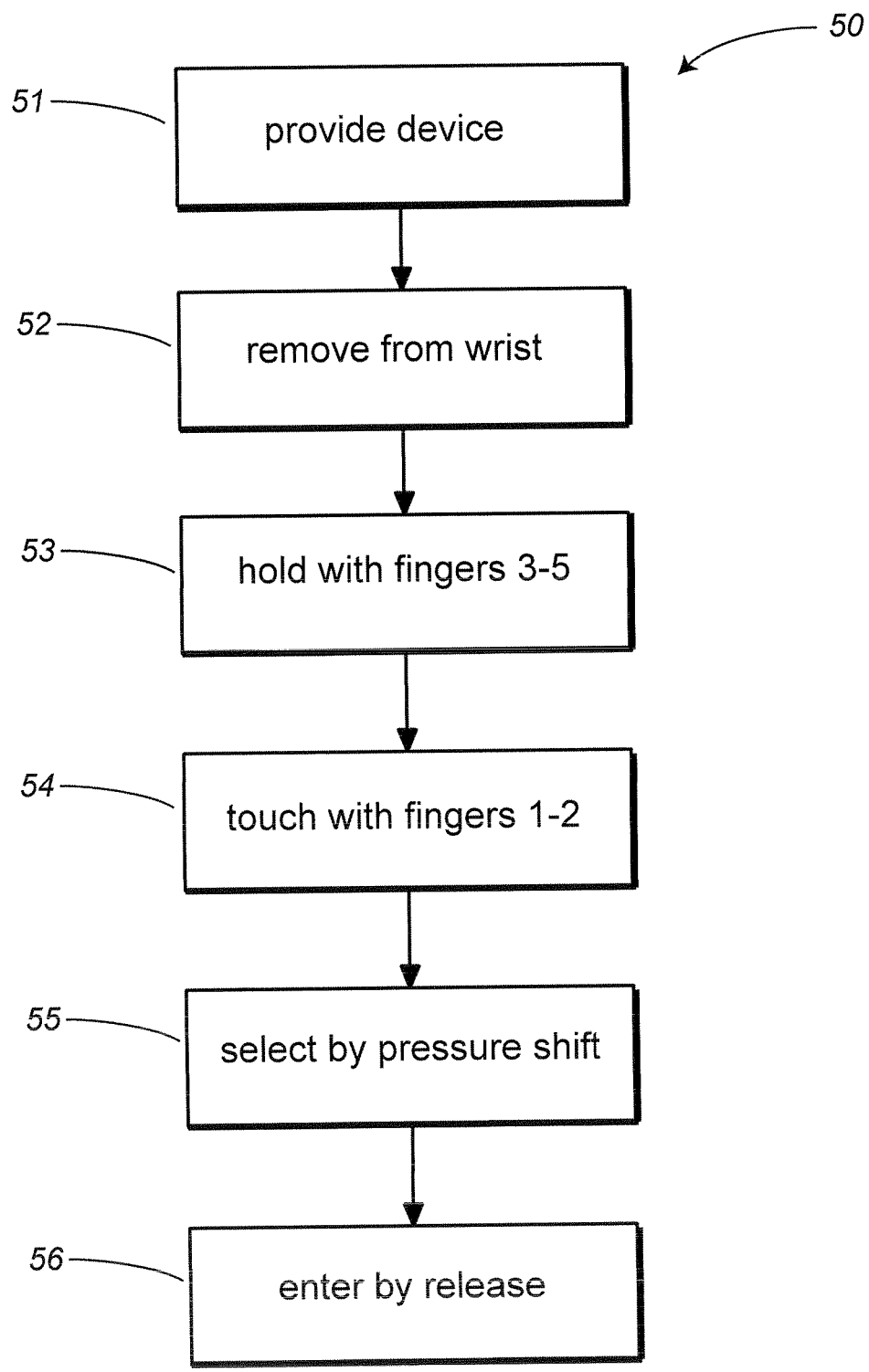
FIG. 9 is a process diagram showing a method of entering data on the data entry device.

An alternate embodiment of the present invention comprises a method of entering data 50 by means of wrist deployment, as shown in FIG. 9. The method of entering data 50 comprises the steps of:

51, providing the data entry device 1 to the wrist of a person for omnipresent use;

52, removing the data entry device 1 from the wrist;

53, holding the data entry device in a readable position with at least one of the holding fingers 23 gripping the wrist band 21 from both sides, whereby the working fingers 24 are deployed to hover over the at least one panel 11;

54, touching at least one bump 12 with a working finger 24 to cause a menu 1, or a sub-menu 16, of functionality choices to appear on the display 7;

55, selecting one of the choices by urging the operative working finger 24 in one of the preferred directions 14 indicated by the sub-menu 16; and 56, entering the selection by releasing the touch.

In a particular alternate embodiment, the touching step 53 comprises simultaneous or sequential touches by the working fingers 24. A simultaneous touch toggles between data entry modes including lower case alpha, upper case alpha, number and character. The sequential touch results in a functional menu 15 according to both the position and sequence of the touches. A functionality is thereafter selected and entered through another touch.

Figure 7:
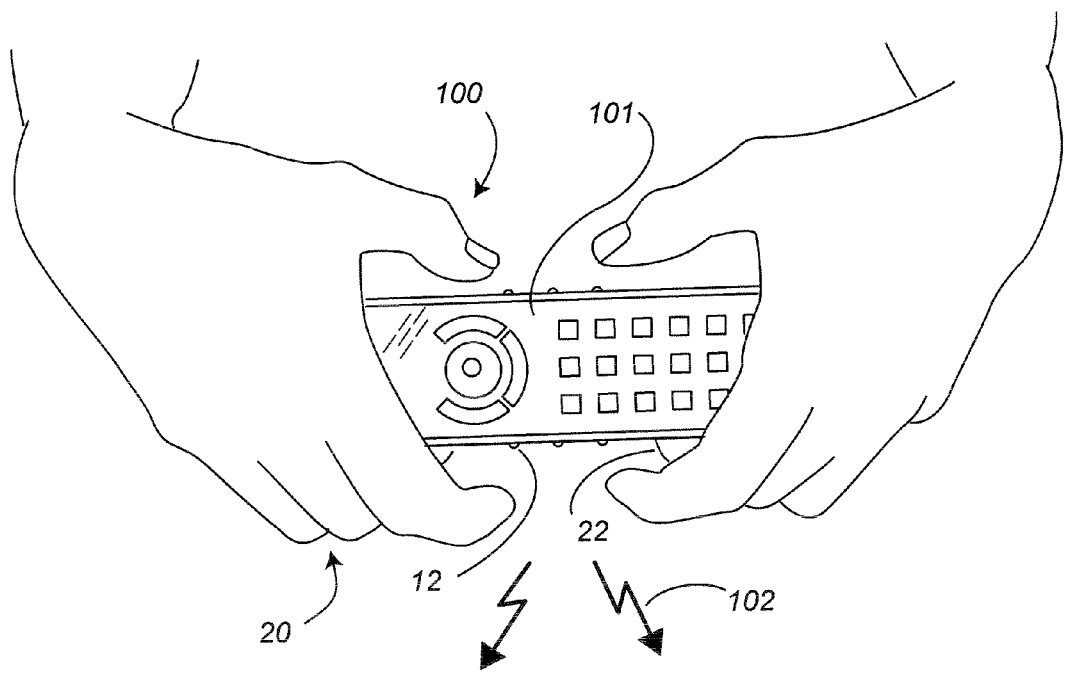
FIG. 7 is a perspective view of the hand and finger positions for holding a TV remote control enabled with technology of the present invention.

In another alternate embodiment, the data entry device 1 may be a hosted data entry 10 device 100, wherein an electronic object 101 otherwise having a primary use is enabled with the technology of the present invention for the secondary use of data entry. The electronic object 101 shown in FIG. 7 is a TV remote control 103, as an example. The TV remote control 103 has been provided with the means for entering data 10 and the means for handling information 30, as described above. A wireless means 102 is used to communicate with a TV in range, which, in this case, serves as the digital display 7 (not shown in FIG. 7). The means for holding 20 utilizes the hand hold 22, which is particularly adaptable to such a bar-like as the TV remote control 103. The electronic object 101 may include such other devices as a cell phone, a PDA, a game controller, or even a flash drive.

In another embodiment, the gripping mechanism is not a watchband, but a retractable band or bands, for example, elastic or hinged, such that they can be extended out from the smart device when typing is required. This would enable a smaller wearable smart device to be carried in a pocket, worn on a belt buckle, clipped to long hair, pinned to a garment, applied to the skin, or worn on a sneaker; and when use is desired, the gripping mechanism can be extended from the small device for gripping purposes and the small device can be typed on.

It is to be understood that the invention is not limited in its application to the details of construction, to the arrangements of the components and to the method of using set forth in the preceding description or illustrated in the drawings. For example, bumps can be added to the fourth panel for a further expansion of functionalities. For another example, if the watch remains on the wrist, the opposing camfered surfaces enable one-handed-two-finger data entry if the processor is reprogrammed to accept three directions of finger motion two directions parallel to the surface of the wrist and one direction perpendicular to the surface of the wrist.

What is claimed is:

1. A data entry device comprising:
a housing including a top surface, two opposing edges of the top surface, and a plurality of stacked panels adjacent each of the opposing edges, wherein the stacked panels include a plurality of delineated regions, the stacked panels being set at a non-zero angle from the top surface and being set at a non-zero angle to one another;
a plurality of sensors associated with a respective one of each of the delineated regions, wherein the sensor detects contact by a user's finger on the delineated region and a sliding motion along the surface of the delineated region in one of at least two non-co-linear directions;
a memory, wherein the memory stores a plurality of symbols, the symbols arranged in one or more groups of symbols, and wherein at least a first group of symbols corresponds with a first one of the delineated regions and wherein a first direction corresponds with a first symbol in the first group of symbols;
a processor connected with the memory and with the sensor, wherein the processor processes a signal from the sensor to detect a direction of the sliding motion along the first delineated region to determine that the direction of sliding motion is in the first direction, and to select the first symbol in said first group of symbols.

2. The device of claim 1, wherein at least one delineated region includes a raised ridge.

3. The device of claim 1, wherein at least one delineated region includes a groove in the surface of the device.

4. The device of claim 1, further comprising a digital display on the top surface operatively coupled with the processor.

5. The device of claim 1, wherein the plurality of stacked panels adjacent one of the opposing edges comprise two panels stacked upper and lower, the upper and lower panels inclined to each other.

6. The device of claim 1, further comprising a wristwatch, a TV remote control, a personal digital assistant, a cell phone, or a game controller.

7. The device of claim 1, wherein the plurality of symbols are alphanumeric characters.

8. The device of claim 7, wherein the first group of symbols comprises a plurality of adjacent keys on a QWERTY keyboard.

9. The device of claim 8, wherein the at least two directions correspond to directions between adjacent keys on the keyboard.

10. The device of claim 1, wherein the housing comprises a watch and watchband.

11. The device of claim 1, wherein the plurality of delineated regions are distinguished by a tactile cue.

12. The device of claim 11, wherein the tactile cue comprises surfaces at a non-zero angle, a perceivable distance separation, a bump, a ridge, or an indentation.

13. The device of claim 1, wherein the delineated regions are distinguished by a visual cue proximal to the delineated regions.

14. The device of claim 13, wherein the visual cue comprises a display of one or more of the plurality of symbols.

15. The device of claim 14, wherein the visual cue for the first delineated region comprises the first group of symbols.

* * * * *